(12) United States Patent
Lilley

(10) Patent No.: US 6,558,103 B2
(45) Date of Patent: May 6, 2003

(54) CONTAINER UNLOADING APPARATUS

(75) Inventor: Mark W. Lilley, Scarborough, ME (US)

(73) Assignee: Southworth Products Corporation, Falmouth, ME (US)

( * ) Notice: Subject to any disclaimer, the term of this patent is extended or adjusted under 35 U.S.C. 154(b) by 0 days.

(21) Appl. No.: 09/835,475

(22) Filed: Apr. 16, 2001

(65) Prior Publication Data

US 2002/0150452 A1 Oct. 17, 2002

(51) Int. Cl.⁷ ............................................... B65G 65/23
(52) U.S. Cl. ....................... 414/356; 414/368; 414/414; 414/421; 414/574; 414/576; 414/265
(58) Field of Search ................... 414/421, 265, 414/419, 420, 414, 354, 355, 356, 360, 572, 573, 574, 575, 577, 582, 576, 583, 810, 809, 371, 754, 368, 369

(56) References Cited

U.S. PATENT DOCUMENTS

| | | | |
|---|---|---|---|
| 2,670,091 A | * | 2/1954 | Sinks .......................... 414/414 |
| 3,717,270 A | | 2/1973 | Rooke et al. |
| 3,754,671 A | * | 8/1973 | Walda .................... 414/414 X |
| 3,955,686 A | | 5/1976 | Kumagai |
| 4,005,792 A | | 2/1977 | Schulman et al. |
| 4,911,602 A | * | 3/1990 | Abe ............................ 414/421 |
| 5,427,492 A | * | 6/1995 | Tanaka et al. .............. 414/414 |
| 5,772,383 A | | 6/1998 | Kalika et al. ................ 414/403 |

FOREIGN PATENT DOCUMENTS

| | | | | |
|---|---|---|---|---|
| EP | 0562688 B1 | 9/1993 | .......... | B65G/65/23 |
| EP | 0562688 A1 | 9/1993 | .......... | B65G/65/23 |

* cited by examiner

Primary Examiner—Frank E. Werner
(74) Attorney, Agent, or Firm—Grossman, Tucker, Ferreault & Pfleger, PLLC

(57) ABSTRACT

An apparatus for unloading packages, parcels, postal items, baggage, etc., from a container having an open side. The apparatus has a sliding wall that is disposed over the open side of the container when the container is receiving within the apparatus. The apparatus, along with the container, is tilted such that the open side of the container is generally directed downward. From this tilted orientation, the sliding wall of the apparatus is withdrawn, incrementally exposing the open side of the container, permitting the controlled egress of the packages, etc., from the container.

9 Claims, 3 Drawing Sheets

CONTAINER UNLOADING APPARATUS

FIELD OF THE INVENTION

The present invention pertains to an apparatus for unloading packages from a container.

BACKGROUND OF THE INVENTION

Traditionally, several methods have been employed for unloading and processing containers of parcels, packages, postal goods, etc. The most basic method involves manually unloading the containers one package at a time. However, this method is very time consuming and has a potential for producing repetitive motion injuries to the people involved in the process. These problems have lead to the advent of a variety of automated, and semi-automated processes.

In addition to manual unloading methods, there exist a number of automated and semi-automated systems for unloading containers. While the known systems vary according to the design of the container itself, the majority of such systems rely on simply dumping the contents from the container onto a conveyor, slide, or the like. However, such dumping systems are often troublesome when employed to empty containers having bar sides, internal shelves and internal brackets, wherein the contents of the container may hang-up on such features. Additionally, inversion dumping often leads to piling of the contents of the container, rather than spreading them in a smooth dispersion onto the conveyor. Furthermore, the tendency of the contents to pile requires that the mouth of the container be elevated above the conveyor a height sufficient to allow the resultant pile to clear the container. This characteristic of inversion dumping makes an already inherently harsh method even rougher on the packages being unloaded.

It would, therefore, be desirable to be able to unload packages from an open front container in a manner that minimizes the probability of damage to the packages, and further releases the packages in a controlled manner in order to prevent piling.

SUMMARY OF THE INVENTION

According to the present invention, there is provided an apparatus for unloading containers, wherein the apparatus comprises a tilting carriage. The carriage is configured to receive the container in a manner such that a slidable wall of the carriage is disposed over an open side of the container, thereby fully enclosing the container. With the container in place in the carriage, the carriage is tilted such that the open side of the container is oriented downward, preferably toward a conveyor, slide, or the like. The slidable wall of the carriage is then displaced from the open side of the container, thereby incrementally opening the container. Consistent with the present invention, the container may be positioned in close proximity to a conveyor prior to releasing the contents of the container, therein minimizing damage to the packages resulting from being dropped. Furthermore, the incremental opening of the container provides for a more gradual release of the contents of the container, thereby reducing problems of piling of the contents on a conveyor, or the like.

BRIEF DESCRIPTION OF THE DRAWINGS

Exemplary embodiments of the invention are set forth in the following description and shown in the drawings, wherein.

DETAILED DESCRIPTION OF THE INVENTION

Figure 1:
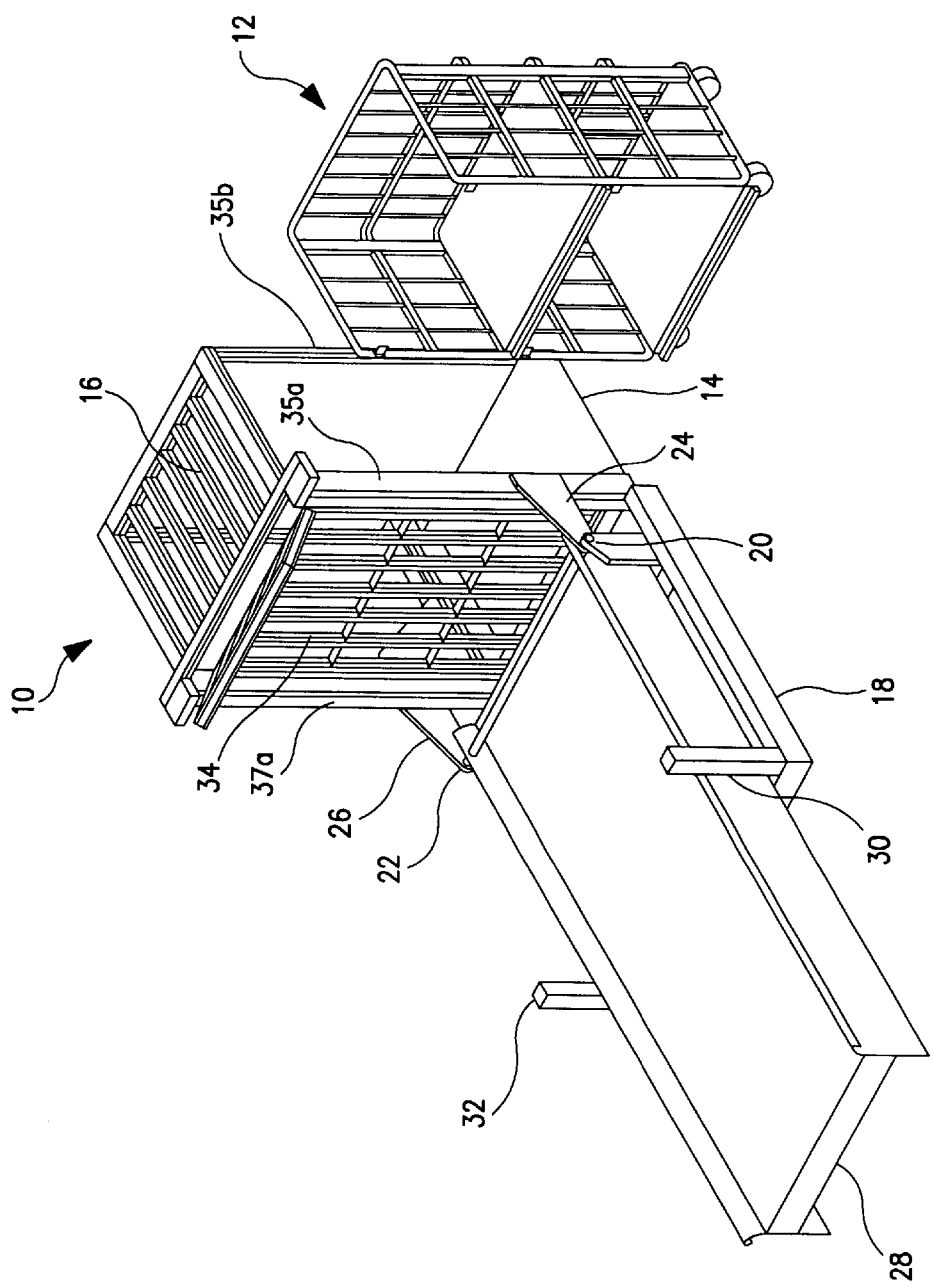
FIG. 1 is a perspective view of an exemplary apparatus consistent with the present invention prior to loading a container.

An apparatus consistent with the present invention may be used for unloading a variety of packages, parcels, postal items, baggage, etc., from containers having an open front side. Although the present invention is not limited thereto, it will be assumed for the purposes of this description that the containers to be unloaded are mobile, such as rolling containers. The unloading of parcels, etc., takes place by tilting the container so that it is open-side-down over an unloading zone, which may comprise a conveyor, a roller bed, a slide, etc., and further effecting a controlled release of the parcels, etc., from the container onto the unloading zone. For ease of understanding, the present invention will be described below in terms of an exemplary embodiment configured to unload postal items, such as parcels and envelopes, from a rolling container having an open front side and an open top side. It will, however, be readily appreciated by those skilled in the art that the principles of the present invention are susceptible for use in unloading any open front container in a controlled manner.

Referring to the drawings, an exemplary apparatus consistent with the present invention is illustrated. The apparatus comprises a carriage 10 configured to receive an open front container 12. The carriage comprises a floor member 14 for supporting the container 12, and a ceiling member 16 spaced from the floor member 14 to limit axial movement of the container 12 within the carriage. Furthermore, the ceiling member 16 is configured to prevent spillage of parcels from the container 12 in the event that the container 12 is of an open top design, as illustrated in the exemplary embodiment. Consistent with this requirement, the ceiling member 16 may range from a solid surface to a retaining arm. In the exemplary embodiment illustrated in FIGS. 1 and 2 the ceiling member 16 comprises bar grate sufficient to prevent the spillage of parcels having a minimum dimension greater than the separation of the bars. Similarly, consistent with the above stated requirements, the floor member 14 may range from a solid surface, as illustrated in the exemplary embodiment, to a pair of forks extending in the direction of loading of the container 12. The employment of these alternate configurations will become more apparent from the below description of the operation of an apparatus consistent with the present invention.

The carriage 10 is pivotally connected to a base frame 18 by pivots 20 and 22. Preferably, the carriage 10 is attached to the pivots 20 and 22 by pivot arms 24 and 26. Pivot arms 24 and 26 provide an increased degree of forward translation of the carriage 10 relative to the base frame 18 during tilting, therein placing a greater amount of the carriage 10, and therein a greater amount of the container 12, over the conveyor 28, which is preferably disposed in front of the carriage 10, when it is in an upright position, and between the frame members of the base frame 18. Additionally, it is advantageous to employ support posts 30 and 32 extending from the base frame 18, wherein the support posts 30 and 32 are configured to receive and support the carriage 10 when it is in a tilted position, as illustrated in FIGS. 2 and 3, enhancing the stability thereof.

The apparatus of the present invention further comprises a front wall 34 that is slidable along the axis of the carriage 10. The front wall 34 is configured to be disposed proximate the front of a container 12 when the container is loaded in the carriage 10. The presence of the front wall 34 effectively provides for full enclosure of the container 12 once it has been loaded into the carriage 10. As with the ceiling member 16, the construction of the front wall 34 is dictated by the size of the packages to be carried by the container 12. As illustrated in FIGS. 1 through 3, when larger packages are anticipated, the carriage 10 may be configured with a bar or slat front wall 34, wherein the separation between bars is less than the minimum dimension of the packages. When smaller packages are anticipated, the front wall 34 may comprise a grate or solid surface, therein preventing spillage of the contents of the container 12. As best shown in FIG. 1, preferably the top edge of the front wall 34, as viewed when the carriage 10 is in an upright position, is angled away from the carriage 10 so that the terminal edge of the front wall 34 lies in close proximity to the conveyor 28 when the carriage 10 is in a tilted position.

Figure 2:
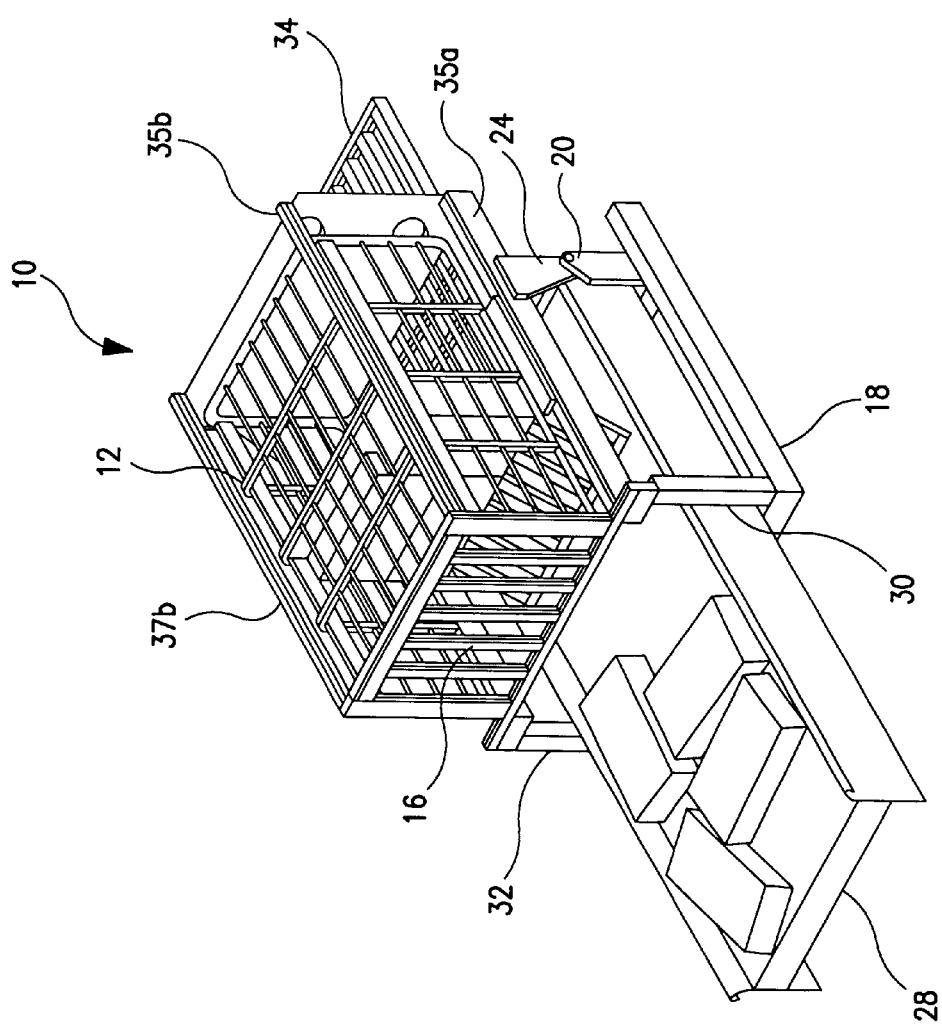
FIG. 2 is a perspective view of an exemplary apparatus consistent with the present invention during the unloading phase.
Figure 3:
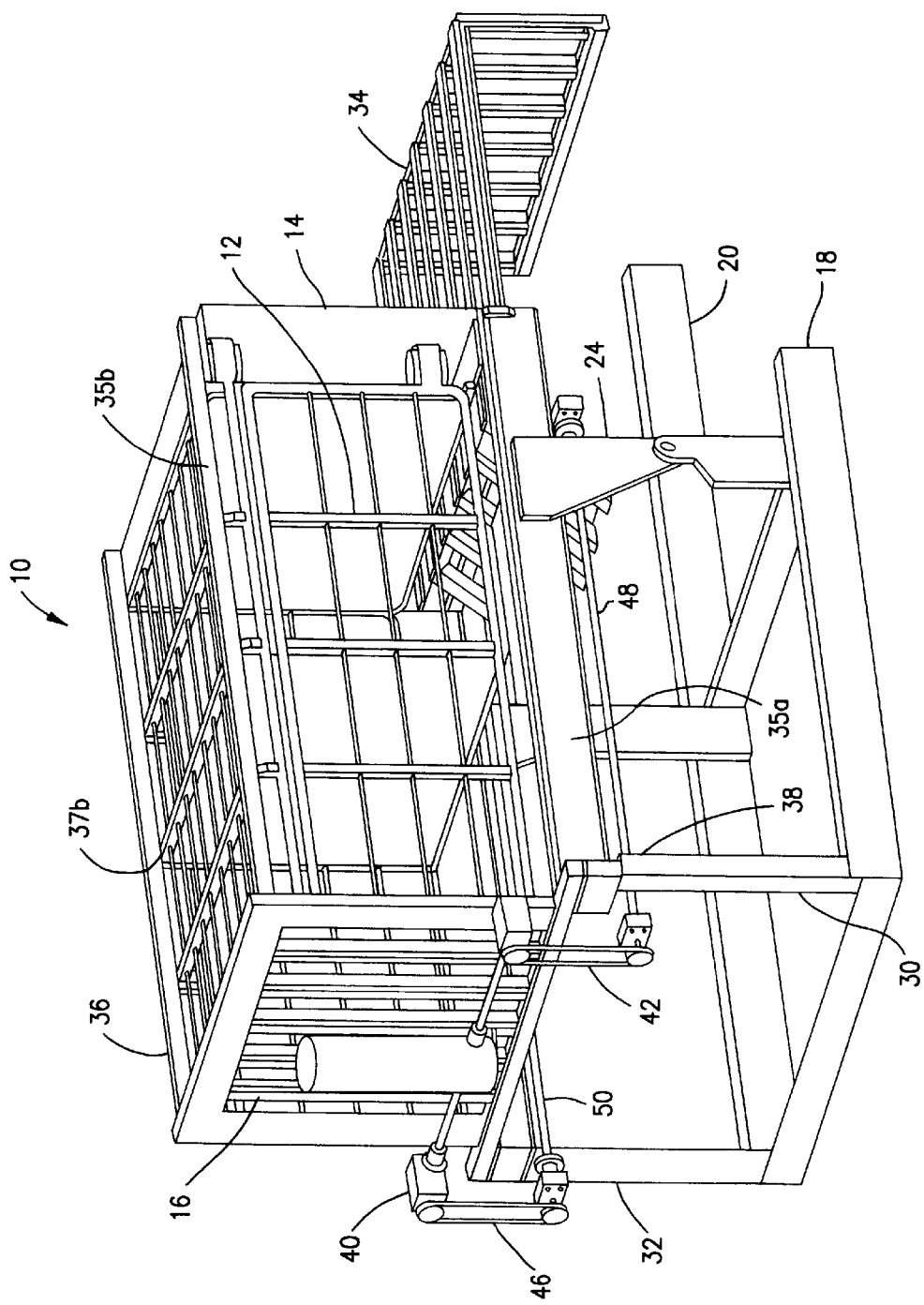
FIG. 3 is a perspective view of an exemplary unloading apparatus consistent with the present invention.

As shown in FIGS. 1 through 3, the carriage 10 further comprises vertical frame components 35a and 35b as well as 37a and 37b. The vertical frame components 35a, 35b, 37a, and 37b may be employed to provide the necessary structural integrity of the carriage 10. Consistent with, and similar to, the above discussed requirements of the floor member 14 and the ceiling member 16, the vertical members 35a, 35b, 37a, and 37b may be present simply as vertically oriented beams, as illustrated in the exemplary embodiment, sufficient to maintain the proper separation of the floor member 14 and the ceiling member 16, and to maintain the integrity of the carriage 10. Additionally, the vertical members 35a, 35b, 37a, and 37b must be configured to permit the ingress and egress of the container 12. However, the form and the structure of the vertical members 35a, 35b, 37a, and 37b may be varied within these requirements from a plurality of vertical members to a plurality of solid surfaces.

In operation, the container 12 may be loaded into the carriage 10 either from the side of the carriage 10, as shown in the illustrated exemplary embodiment, or alternately may be loaded into the carriage 10 from the rear. The carriage 10, having the container 12 received therein, is then tilted to a substantially horizontal position about pivots 20 and 22, and is supported in the horizontal position by support posts 30 and 32. As previously noted, the carriage 10 may be pivotally connected to the base frame 18 by way of pivot arms 24 and 26, therein providing a greater forward displacement of the carriage 10, and the container 12 therein, relative to the base frame 18 and the conveyor 28. When the carriage 10, and the container 12 therein, are in the tilted position, the contents of the open front container 12 will be resting on the inside of the front wall 34.

The tilting action of the carriage 10 may be achieved either manually, or in an automated or semi-automated manner. In a preferred embodiment consistent with the present invention, the carriage 10 is tilted by a hydraulic or pneumatic actuator, such as a piston disposed between the carriage 10 and the base frame 18. Alternate automated means for tilting the carriage may include an electric motor acting at one, or both, of the pivots 20 and 22. Additional methods of achieving a tilting action of the carriage 10 will be readily apparent to those having skill in the art.

After the carriage 10 has been moved to a generally horizontal position, the container 12 may be unloaded, as onto a conveyor 28 as illustrated in FIG. 2. The container 12 is unloaded by sliding the front wall 34 along the axis of the carriage 10 in the direction of the floor member 14, i.e., rearward. The rearward displacement of the front wall 34 provides an enlarging opening in the front of the carriage 10 allowing egress of parcels from the container. This growing opening will allow the contents of the container 12 to shingle out, i.e., exit the container in a dispersed manner, wherein the parcels that were at the top of the container 12, before it was tilted, will be allowed to exit the container 12 first, when the front wall has undergone a minimal of displacement. It will be appreciated at this point that, in order to undergo the unloading operation, the container 12 must be retained within the carriage 10 when the front wall 34 is in an open position. This may easily be accomplished by providing front vertical members 35a and 37a horizontally spaced from one another a distance less than the width of the container 12, therein preventing the forward egress of the container 12. Alternately, the carriage 10 may be provided with detents or other retention features similarly preventing the forward egress of the container 12 when the carriage 10 is in a tilted position, and the front wall 34 is in an open position.

The sliding action of the front wall 34 may be effected by a variety of mechanical or manual means. In the exemplary embodiment illustrated in FIG. 3, the front wall 34 is actuated by a worm drive mechanism comprising a centrally mounted motor 36 working through a system of gear boxes 38 and 40 and belts 42 and 46 to drive a worm shaft 48 and 50 on either side of the carriage 10. The worm shaft 48 acts in conjunction with drive feature 50 to effect the translation of the front wall 34 along the worm shaft 48. It will be appreciated by those skilled in the art, however, that there are a multitude of alternate ways to accomplish the sliding action of the front wall, including, but not limited to, direct belt or chain drive, linear hydraulic or pneumatic actuators, etc.

Discharging the parcels from the exemplary apparatus in the above-described manner makes it less likely that the contents of the container 12 will become caught in side of the container 12. Furthermore, the gradual release of the parcels from the container 12, a product of the sliding front wall 34, will allow the parcels to be discharged in a metered or single layer, rather than in a pile or clump, therein allowing easier secondary process handling. Finally, the angled nature of the top of the front wall 34 provides a chute between the interior of the container 12 and the conveyor 28, therein allowing a much more gentle discharge of the contents than simply dumping the parcels out. This characteristic has the result of causing less damage to the parcels during processing.

It will be appreciated that the exemplary embodiment described and depicted in the accompanying drawings herein is for illustrative purposes only, and should not be interpreted as a limitation. It is obvious that many other embodiments, which will be readily apparent to those skilled in the art, may be made without departing materially from the spirit and scope of the invention as defined in the appended claims.

What is claimed is:

1. An apparatus for unloading a container having at least one open side, the apparatus comprising:
   a base frame;
   a carriage rotatably mounted to said base frame and configured to receive said container, the carriage comprising a slidable wall portion for positioning adjacent to said open side of said container, wherein the carriage is configured to rotate relative to said base frame sufficient to orient said open side of said container in a generally downward orientation with said container retained within said carriage, said slidable wall portion being slidable relative to said carriage to increasingly remove any obstruction between said open side of said container and a conveyor, said slidable wall portion comprising an integral angularly disposed end for gradually guiding contents of said container out of said container and onto the conveyor.

2. The apparatus according to claim 1, wherein said carriage is connected to said base frame by at least one pivot.

3. The apparatus according to claim 2, wherein said carriage is connected to said base frame at least one pivot by at least one pivot arm, thereby spacing said carriage from an axis of rotation of said at least one pivot.

4. The apparatus according to claim 1, said apparatus further comprising a drive mechanism coupled to said slidable wall portion, wherein said drive mechanism is configured to slide said slidable wall portion relative to said carriage.

5. The apparatus according to claim 4, wherein said drive mechanism comprises a worm drive.

6. The apparatus according to claim 1, wherein the carriage further comprises a ceiling member and an opposed floor member, wherein said ceiling member is spaced from said floor member to constrain said container against motion therebetween.

7. The apparatus according to claim 6, wherein said floor member comprises a solid surface.

8. The apparatus according to claim 6, wherein said ceiling member comprises a grate.

9. The apparatus according to claim 1, said base frame comprising at least one support post, wherein said carriage is at least partially supported by said support post when said carriage is in a rotated configuration.

* * * * *